United States Patent

Lavi et al.

[11] Patent Number: 5,819,691
[45] Date of Patent: Oct. 13, 1998

[54] APPARATUS FOR COLLECTING ANIMAL WASTE DEPOSITS

[76] Inventors: Yaakov Lavi, POB 141, Shavei Zion 25227; Amotz Yavnai, Harav Kook Street, Kiriat Motzkin 26360, both of Israel

[21] Appl. No.: 756,071

[22] Filed: Nov. 25, 1996

[30] Foreign Application Priority Data

Mar. 6, 1995 [IL] Israel ......................................... 112898
Mar. 3, 1996 [IL] Israel ......................................... 117342

[51] Int. Cl.⁶ ................................................. A01K 23/00
[52] U.S. Cl. ................................................. 119/868
[58] Field of Search .................. 119/868, 869, 119/867

[56] References Cited

U.S. PATENT DOCUMENTS

| | | | |
|---|---|---|---|
| 3,090,356 | 5/1963 | Andrisani . | |
| 4,103,645 | 8/1978 | Tyler | 119/868 |
| 4,103,952 | 8/1978 | Thompson | 294/1 R |
| 4,226,456 | 10/1980 | Barnett | 294/1 B |
| 4,269,148 | 5/1981 | Holley-Donawa | 119/868 |
| 4,444,152 | 4/1984 | Berardo | 119/868 |
| 4,502,417 | 3/1985 | Jenkins | 119/868 |
| 4,645,251 | 2/1987 | Jacobs | 294/1.3 |
| 4,677,697 | 7/1987 | Hayes | 2/159 |
| 4,709,661 | 12/1987 | Mayle, Jr. | 119/868 |
| 4,846,586 | 7/1989 | Bruno | 383/9 |
| 4,896,912 | 1/1990 | Parnell | 294/1.3 |
| 4,969,419 | 11/1990 | Fong | 119/868 |
| 5,005,525 | 4/1991 | Stanton | 119/868 |
| 5,100,000 | 3/1992 | Huseman | 206/554 |
| 5,315,960 | 5/1994 | Lamp | 119/868 |
| 5,355,836 | 10/1994 | Vallery | 119/868 |
| 5,363,809 | 11/1994 | Roe | 119/792 |
| 5,386,802 | 2/1995 | Hang-Fu | 119/868 |
| 5,427,059 | 6/1995 | Logan | 119/868 |

Primary Examiner—Michael J. Carone
Assistant Examiner—Yvonne R. Abbott
Attorney, Agent, or Firm—Abelman, Frayne & Schwab

[57] ABSTRACT

A harness-type device is disclosed for collecting the waste products of an animal, such as a dog. The harness includes a collection bag which is in appropriate contact with the animal's body when the harness is worn to collect all the waste products. Several embodiments are shown which, preferably, may include i) flexible straps for comfortably retaining the harness, ii) adjustment according to the size of the animal, and iii) a strap which encircles the tail.

23 Claims, 6 Drawing Sheets

APPARATUS FOR COLLECTING ANIMAL WASTE DEPOSITS

FIELD OF THE INVENTION

The present invention relates to apparatus for collecting animals waste deposits.

BACKGROUND OF THE INVENTION

Animal waste deposits, i.e. urine and in particular feces deposits, create a health, cleanliness and aesthetic problem in urban and non-urban areas.

One type of solution to the above problems is to enact regulations which require the animal owner to collect his animal's feces. However, it is often difficult to enforce these regulations since the animal's owner has to collect the feces from the ground every time his animal discharges it.

A solution to the above problem is to provide an animal toilet garment, such as the one described in U.S. Pat. 3,090,356 to Andrisani. As shown in FIGS. 1 and 2 to which reference is now made, the animal toilet garment described by Andrisani includes a waist strap 10, side straps 12 connected thereto, a side strap support 14, a feces bag collection holder 16 which together form the animal toilet garment, and a feces collection bag 18. The waist strap 10, the side straps 12 and the side straps support 14 include at least one buckle, referenced 20, 22 and 24, respectively, for adjusting the length of each one of them separately in accordance with the animal size. The animal toilet garment also includes a separate urine collection bag 26.

The animal toilet garment described by Andrisani has several disadvantages:

A. According to Andrisani, only the collection bag is disposable and being replaced after the animal discharges feces, since all other elements form the animal toilet garment.

B. The apparatus for collecting the animal feces is loose since the bag collection holder 16 is formed of a rigid frame which should not contact the sensitive anus zone. This is unaesthetic since it does not assure that all the feces will reach the collection bag.

C. In order to adjust the length of any of the waist strap 10, the side straps 12 or the support strap 14, the respective buckles 20, 22 and 24 have to be adjusted.

D. The apparatus for collecting the animal urine 26 is a different apparatus and therefore, in order to collect both feces and urine deposits, the animal's owner has to adjust the position of the buckles, the feces collection bag and the urine collection bag.

SUMMARY OF THE INVENTION

It is therefore an object of the present invention to provide an improved apparatus for animal waste deposits collection.

According to one aspect of the present invention, there is provided apparatus for animal feces collection which includes a collection bag and straps attached thereto, the apparatus can be connected to a waist strap or to any suitable animal's garment.

According to another aspect of the present invention, there is provided apparatus for animal waste deposits, i.e. both feces and urine, collection which includes a collection bag and straps attached thereto, the apparatus can be connected to a waist strap or to any suitable animal's garment.

According to the present invention, the collection bag of the apparatus for waste deposits collection is in tight contact with the animal's body around its anus or around both its anus and its organ.

According to another aspect of the present invention, the apparatus for animal's waste deposits includes a flexible strap hooked around the animal's tail to ensure that the feces collection bag will be in tight contact with the animal's body around the respective organs at the time of waste deposits discharge.

According to yet another aspect of the present invention, the apparatus for animal's waste deposits collection may also collect blood from a female animal during estrus and may be used as a contraceptive against undesired pregnancy during the estrus periods.

There is thus provided, in accordance with a preferred embodiment of the present invention, apparatus for collecting animal waste deposits discharges, such as feces discharges, from an animal wearing a garment which includes a collection bag for collecting the animal waste deposits, and at least one strap for connecting the collection bag to the garment, wherein the collection bag is in contact with the animal body when the at least one strap being connected to the garment. The garment may be any animal's garment and also a waist strap.

Further, according to a preferred embodiment of the present invention, the apparatus may also include an additional strap connected to the collection bag, the additional strap being around the tail of the animal or connected to the garment top for animals not having a tail.

According to a preferred embodiment of the present invention, any of the at least one strap and the additional strap is a flexible strap. Alternatively, their length can be adjusted to a desired length.

There is also provided, in accordance with a preferred embodiment of the present invention, apparatus for collecting animal waste deposits discharges, such as feces discharges which includes a first strap, a collection bag for collecting the animal waste deposits, and at least one second strap for connecting the collection bag to the first strap wherein the collection bag is in contact with the animal body when the at least one second strap being connected to the first strap. The first strap may be part of an animal garment.

Additionally, the apparatus may include a third strap connected to the collection bag, the third strap being around the tail of the animal.

According to one preferred embodiment of the present invention, any of the first strap, at least one second strap and third strap is a flexible strap. Alternatively, or in addition thereto, their length can be adjusted to a desired length.

Further, according to a preferred embodiment of the present invention, the collection bag includes a support, which preferably forms a shape of an arch, to which the at least one strap is being connected and which is in contact with the animal body, and a bag connected to the support for collecting the waste deposits.

According to one preferred embodiment of the present invention, one side of each of the at least one strap and the additional strap is tied around a respective hole in the support.

There is further provided, in accordance with a preferred embodiment of the present invention, apparatus for collecting animal waste deposit discharges. The apparatus includes a harness worn by the animal and a waste collector. The waste collector includes a collection bag and a bag support integrally connected to the collection bag. The waste collector is in contact with the animal body and is removably connected to the harness.

Furthermore, according to a preferred embodiment of the present invention, the harness includes a main waist strap, a plurality of side straps and an annular component. One end of each of the plurality of side straps is connected to the main waist strap and the opther end is connected to the annular component.

Furthermore, according to a preferred embodiment of the present invention, the annular component includes a plurality of tail straps whose length can be adjusted.

Finally, according to a preferred embodiment of the present invention, the apparatus is also operative as a contraceptive for female animals.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
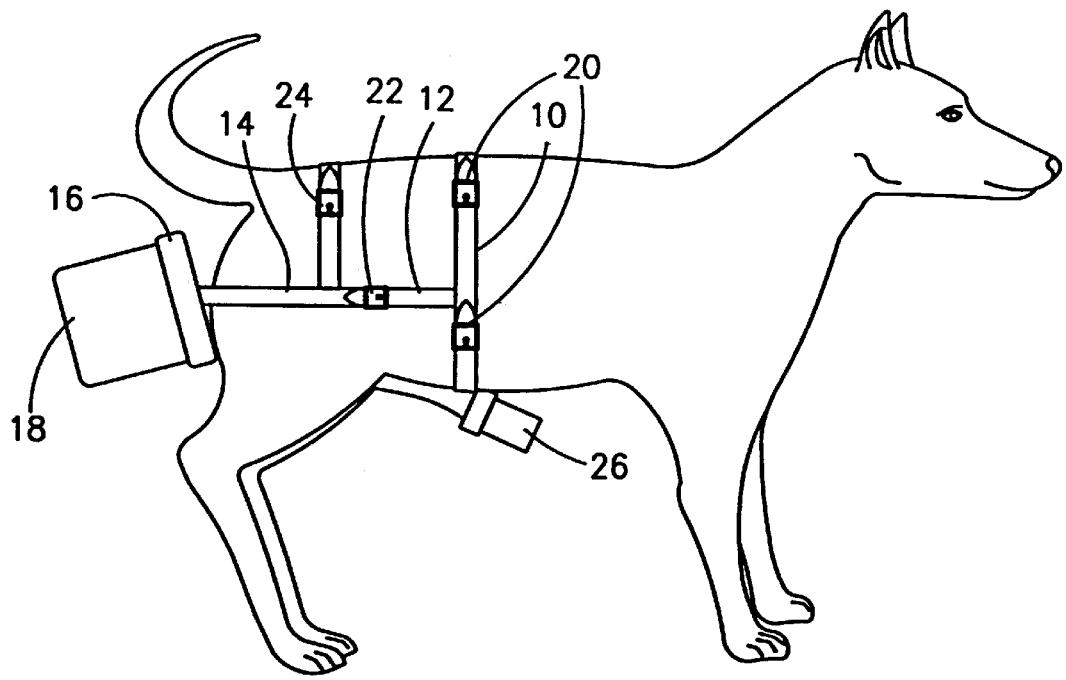
FIG. 1 is a side view of a prior art animal toilet garment worn by a dog.
Figure 2:
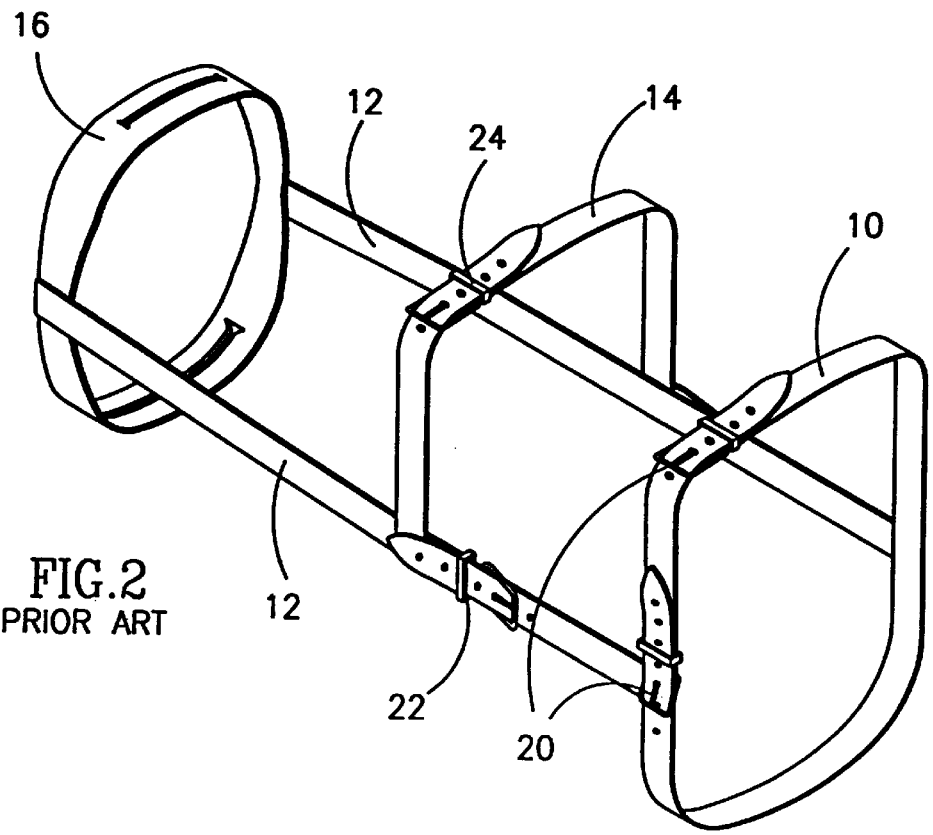
FIG. 2 is a perspective view of the prior art animal toilet garment of FIG. 1.
Figure 3A:
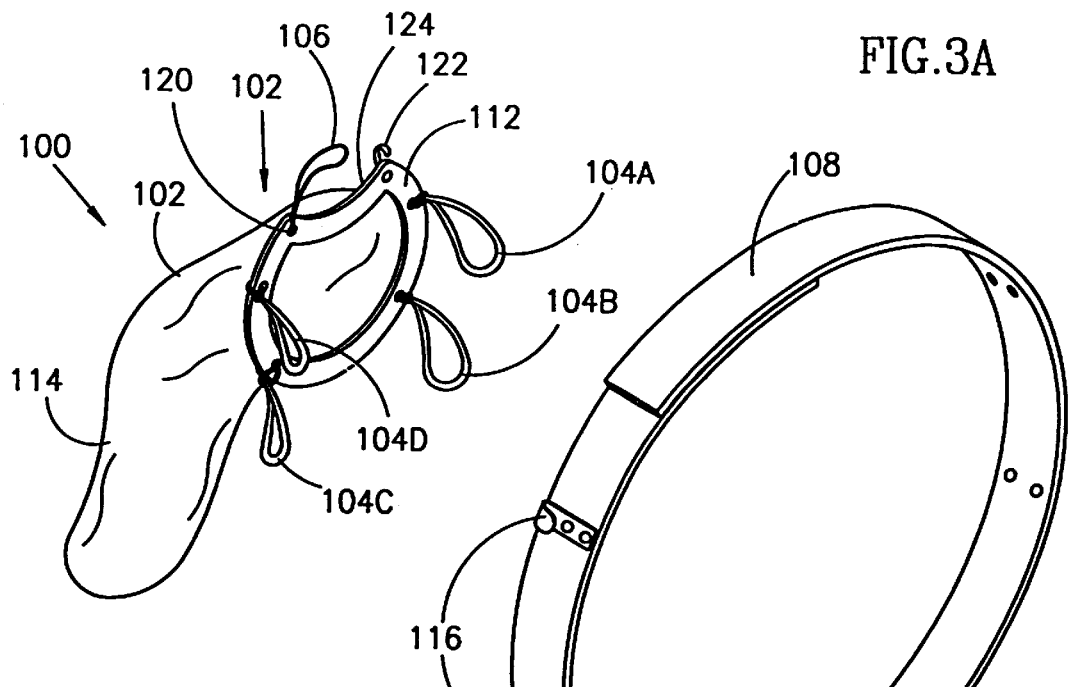
FIG. 3A is a schematic illustration of the apparatus for feces collection in its unassembled position.
Figure 3B:
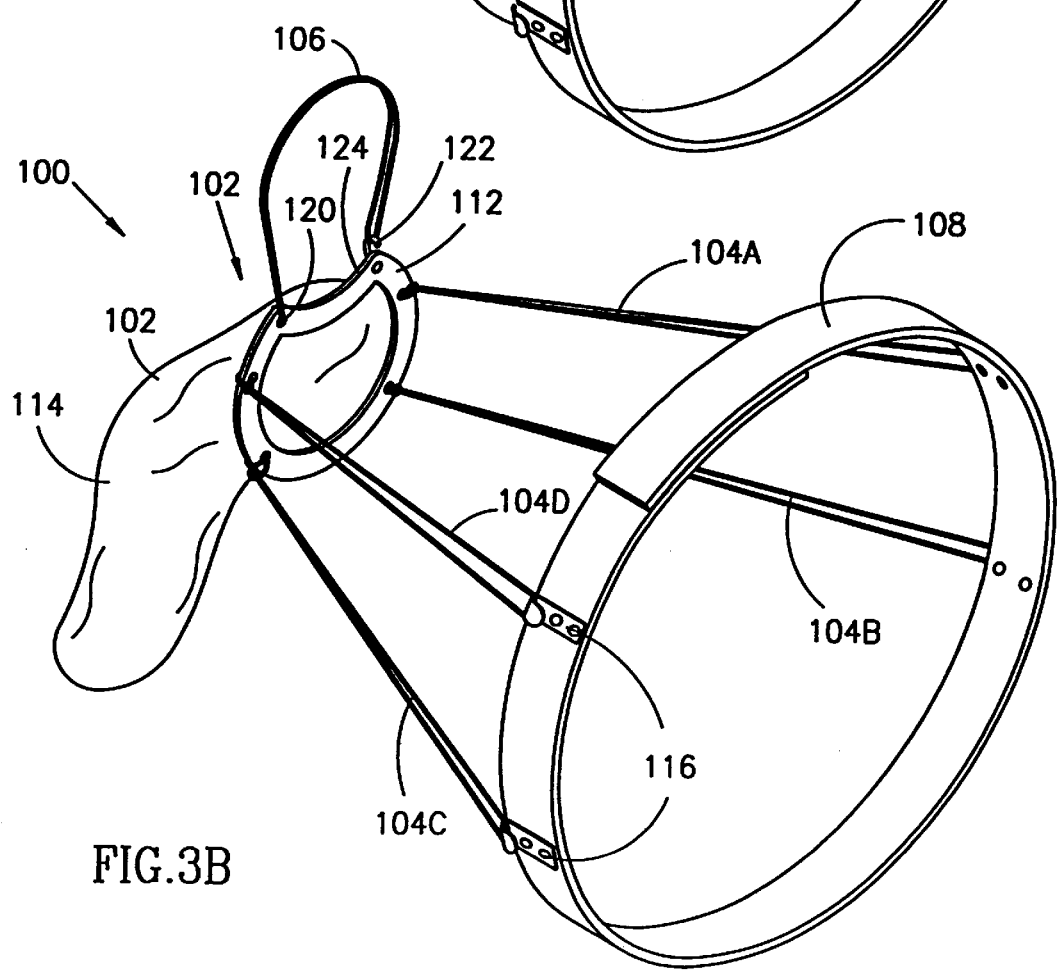
FIG. 3B is a schematic illustration of the apparatus for feces collection in its assembled position.
Figure 4:
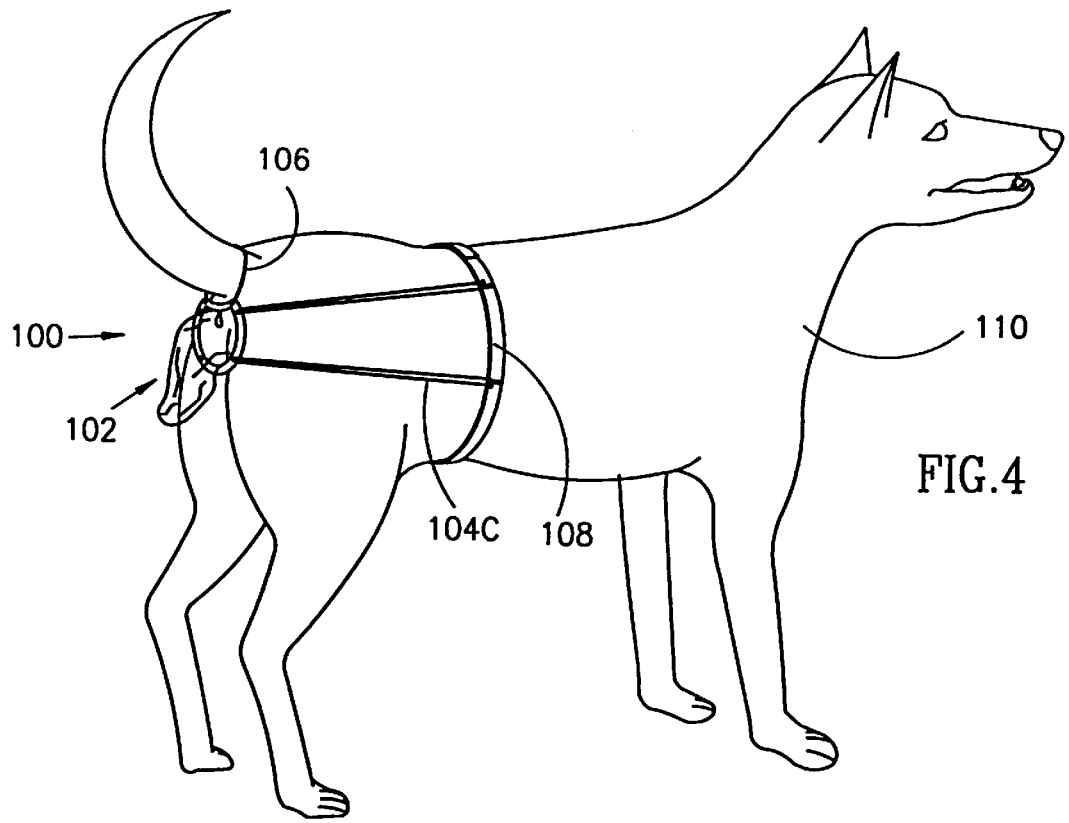
FIG. 4 is a side view of apparatus for animal feces collection, constructed and operative in accordance with a preferred embodiment of the present invention.

Reference is now made to FIGS. 3A, 3B and 4 which illustrate apparatus for animal's feces collection, constructed and operative according to a preferred embodiments of the present invention.

The apparatus for animal's feces collection, generally referenced 100, preferably comprises a feces collection bag 102 and at least one side strap, collectively referenced 104, connected thereto. In the illustrated embodiment four side straps are shown for exemplary purposes only and are referenced 104A, 104B, 104C and 104D. The apparatus 100 may also include a tail strap 106.

In the illustrated embodiment, the side straps 104 connect the collection bag 102 to a waist strap 108. The waist strap 108 can be made of any suitable material such as from leather or plastic. In the illustrated embodiment, the waist strap 108 is closed around a dog 110 using any suitable material, one side of which is fastened to its other side, such as a Velcro® fastener.

Figure 5:
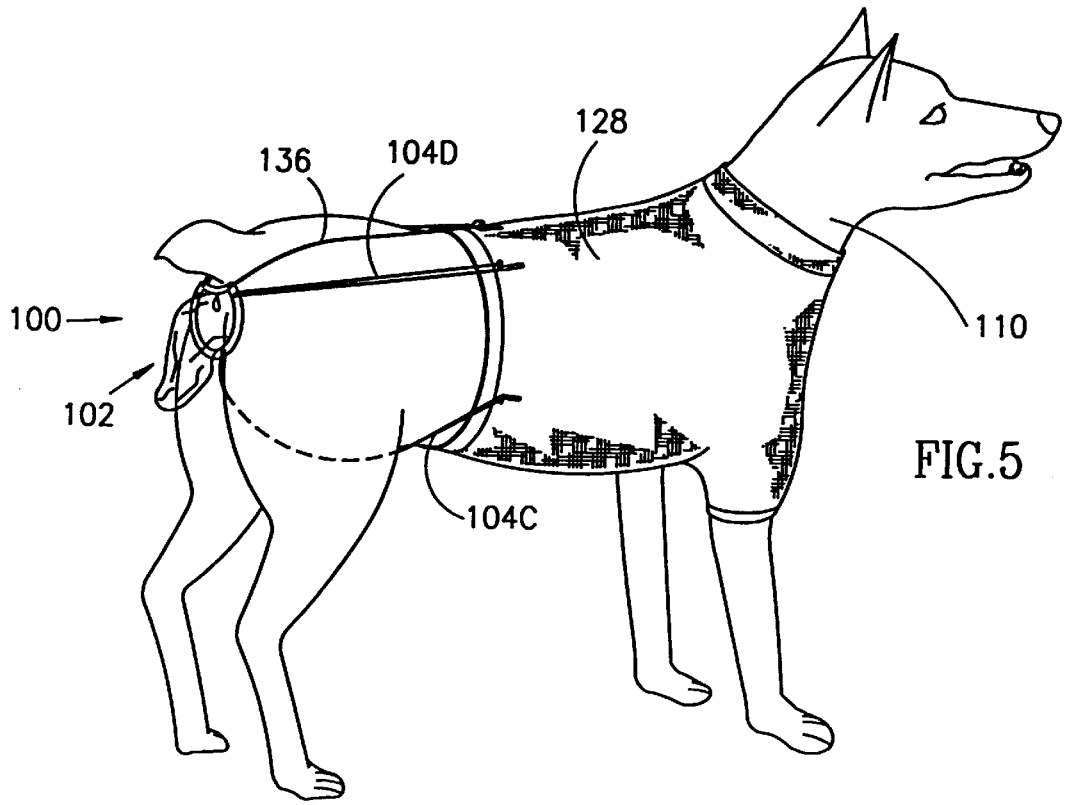
FIG. 5 is a side view of apparatus for animal feces collection, constructed and operative in accordance with another preferred embodiment of the present invention.

According to an alternative embodiment of the present invention, the side straps 104 may be connected to any suitable animal garment worn by the animal, such, as dog garment 128 (FIG. 5).

The collection bag 102 is preferably made from a support 112, which is preferably, but not necessarily, both flexible and soft not to disturb the animal's body when attached thereto and rigid enough to support the stress created by connecting the collection bag to the waist strap 108, and a bag 114 connected thereto, for collecting the discharged feces. The bag 114 recycle may be made of any suitable material and preferably from water proof material, such as water proof plastic.

Alternatively, the support 112 and the bag 114 may be formed of the same material to form one integral unit, such as from Latex.

The side straps 104 and the tail straps 106 are preferably made of any suitable material, such as from rubber, plastic or cotton. It is a particular feature of the present invention that the side straps are made of flexible material, such as rubber.

It will be appreciated that the apparatus 100 is shown in FIGS. 3B and 5 in its assembled state, i.e. where the side straps 104 connect the waist strap 108 to the collection bag 102 and the tail strap 106 is connected to the collection bag 102 around the dog's tail.

As illustrated in FIG. 3A, in its unassembled state the waist strap 108 is detached from the apparatus 100.

According to one preferred embodiment, all the parts of the apparatus but the waist strap 108 are disposed after feces discharge, thereby avoiding close contacts of the hands with the anus area or the feces collection bag 102. Preferably, both the side straps 104, the tail strap 106 and the collection bag 102 are made of relatively inexpensive materials, such as rubber, cardboard or plastic and preferably of recyclable materials.

In the illustrated embodiment of the present invention the waist strap 108 includes hooks 116, for hooking the side straps 104 thereon. As best seen for side strap 104D, each one of the side straps 104 is tied around a hole 118 in the support 112 on one end thereof and is hooked on one of the hooks 116 on its other end.

Alternatively, the side straps can be glued or fused to the collection bag, such that the apparatus 100 forms one integral piece.

In the illustrated embodiment, one end of the tail strap 106 is tied around hole 120 and its other end is hooked on the hook 122 whereas the strap is around the animal's tail. The tail strap further fastens the collection bag 102 to the animal's body to ensure that the discharged feces will fall into the bag 114.

According to an alternative preferred embodiment of the present invention, only the bag 114 is disposable while the bag support 112, the side straps 104 and the tail strap 106 may be reused. For this alternative embodiment, the bag 114 may be connected to the support 112 by any suitable connection, such as by plastic push buttons. After feces discharge, the side straps 104 are preferably being unhooked from the waist strap 108 as described hereinabove, such that the hands of the animal's owner are away from the animal's anus, but unlike the embodiments described hereinabove, the bag 114 is separated from the support 112 and only the bag 114 is being disposed.

It will be appreciated that the bag 114 may include any absorbing material to absorb the liquids of the dog's waste deposits, such as a sponge.

It will be appreciated that the shape of the upper part of the support 112, referenced 124 is preferably arched so as to better fit under the animal's tail.

It is a particular feature of the present invention that the apparatus 100 is in contact with the dog's 110 body around its anus to ensure that all feces discharges fall into the collection bag 102. In the illustrated embodiment, the tail strap 106 and the side straps 104 ensure the contact of the support 112 to the dog's 110 body.

Figure 7:
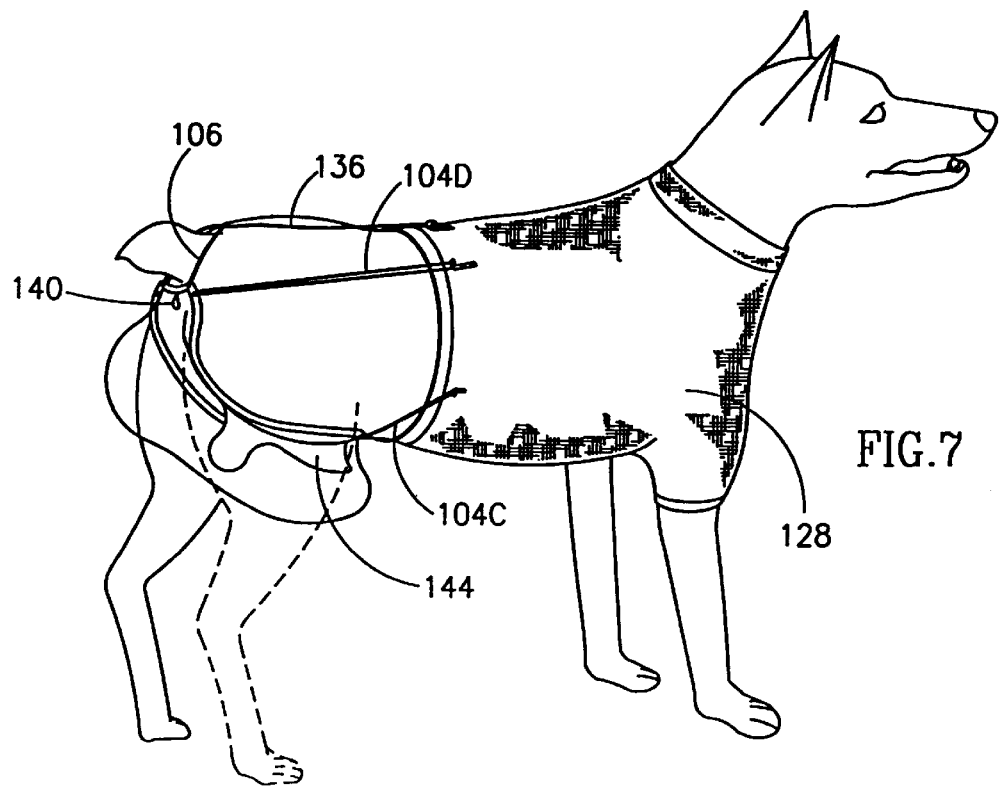
FIG. 7 is a side view of apparatus for animal waste deposits collection, constructed and operative in accordance with another preferred embodiment of the present invention.

Alternatively, as shown in FIG. 5 to which reference is now made, the tail strap 106 can be replaced by at least one back strap 136. The back strap 136 may be connected to the collection bag (FIG. 5) or to the tail strap 106 (FIG. 7). When the back strap 136 is connected to the tail strap 106, whenever the dog lifts his tail, such as at the time of feces discharge, the apparatus 100 even further attaches the dog's body around the anus. This is particularly useful when the dog tail has been shortened as shown for the dog of FIG. 5.

According to another preferred embodiment of the present invention, at least part of the side straps, as shown in FIG. 5 for the side strap 104C, may be connected to the waist strap or the animal's garment 128 under the dog's leg.

Figure 6:
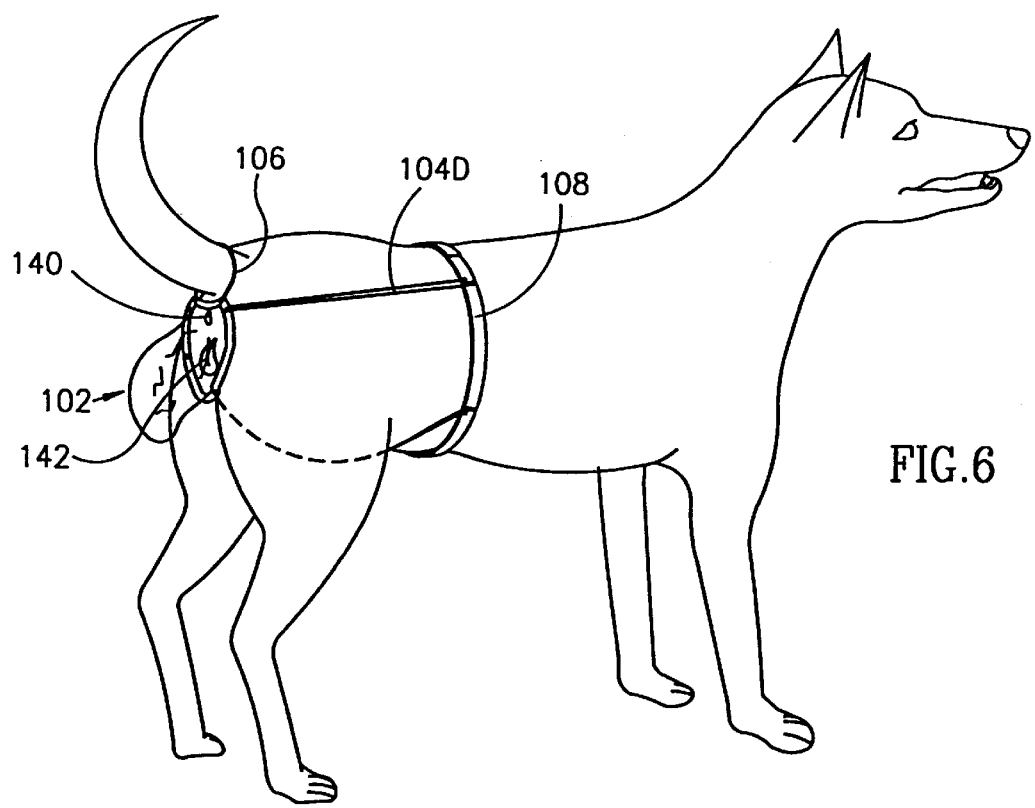
FIG. 6 is a side view of apparatus for animal waste deposits collection, constructed and operative in accordance with a preferred embodiment of the present invention.

It will be appreciated that the apparatus for feces collection described hereinabove with respect to the embodiments of FIGS. 3–5 may also be used for both feces and urine collection as shown in FIGS. 6 and 7 to which reference is now made. Similar elements in FIGS. 3–5 and FIGS. 6 and 7 are referenced by similar reference numerals.

As shown in FIG. 6, when the support 112 is large enough to be in contact with a female dog body around both its anus 140 and its organ 142, the collection bag 114 collects both feces and urine deposits therefrom. As shown in FIG. 7, when the support 112 is large enough to contact the male dog body around both its anus 144 and its organ 146, the apparatus 100 collects both feces and urine deposits therefrom.

It will be appreciated that the apparatus of FIG. 6 may be also used to collect blood from the female organ during estrus and as a contraceptive to protect the female dog from pregnancy during estrus periods.

It will be appreciated that the size of any one of the elements described hereinabove, such as the collection bag 102, the side straps 104, the tail strap 106 and the waist strap 110 can be determined in accordance with the dog size. Preferably, the size of any of the straps can be adjusted in accordance with the dog's size to ensure close contact of the support 112 with the dog's body around its anus or around its anus and its organ.

Figure 8:
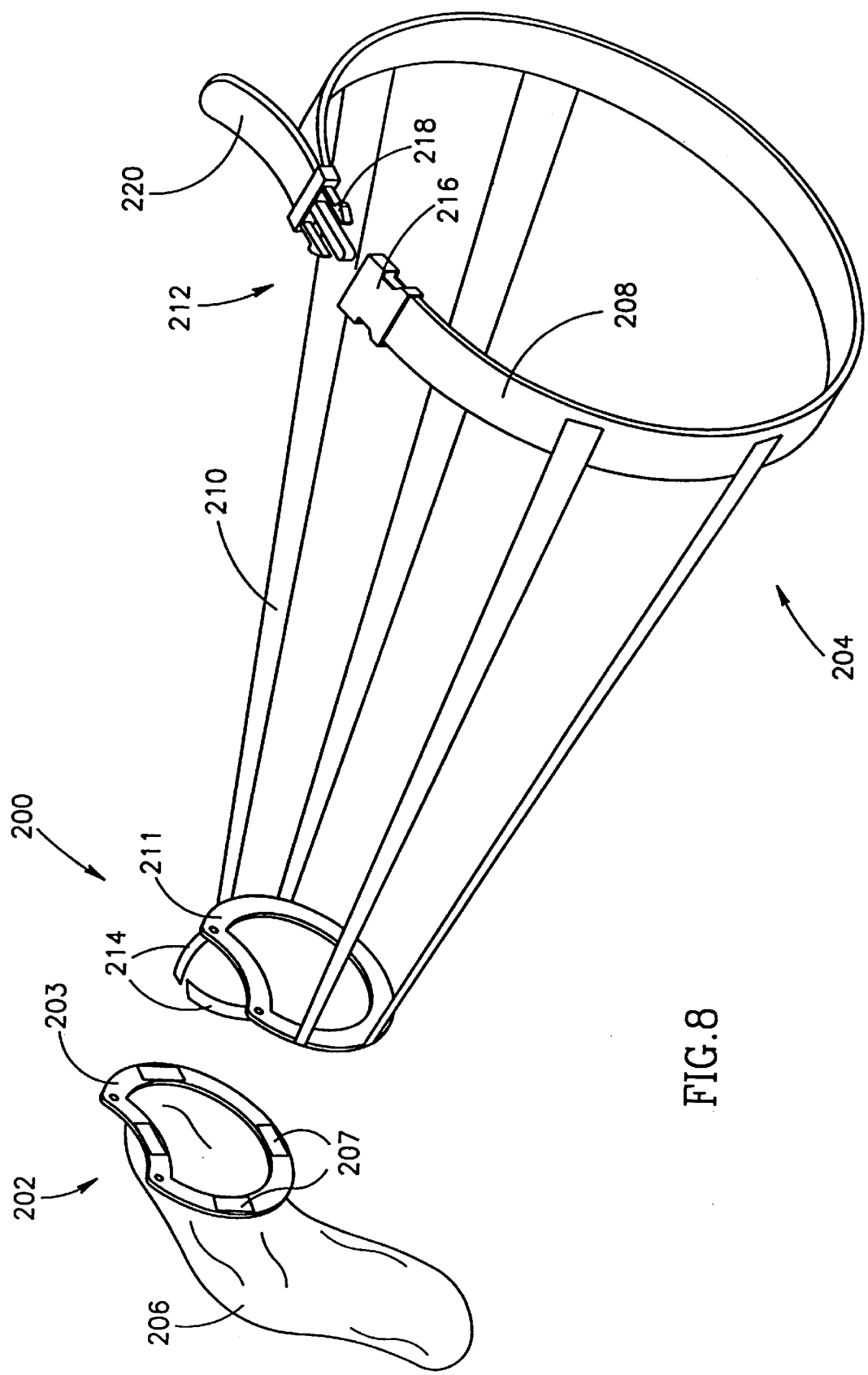
FIG. 8 is a schematic illustration of a further embodiment of the apparatus for feces collection in its assembled position, constructed and operative in accordance with a preferred embodiment of the present invention.
Figure 9:
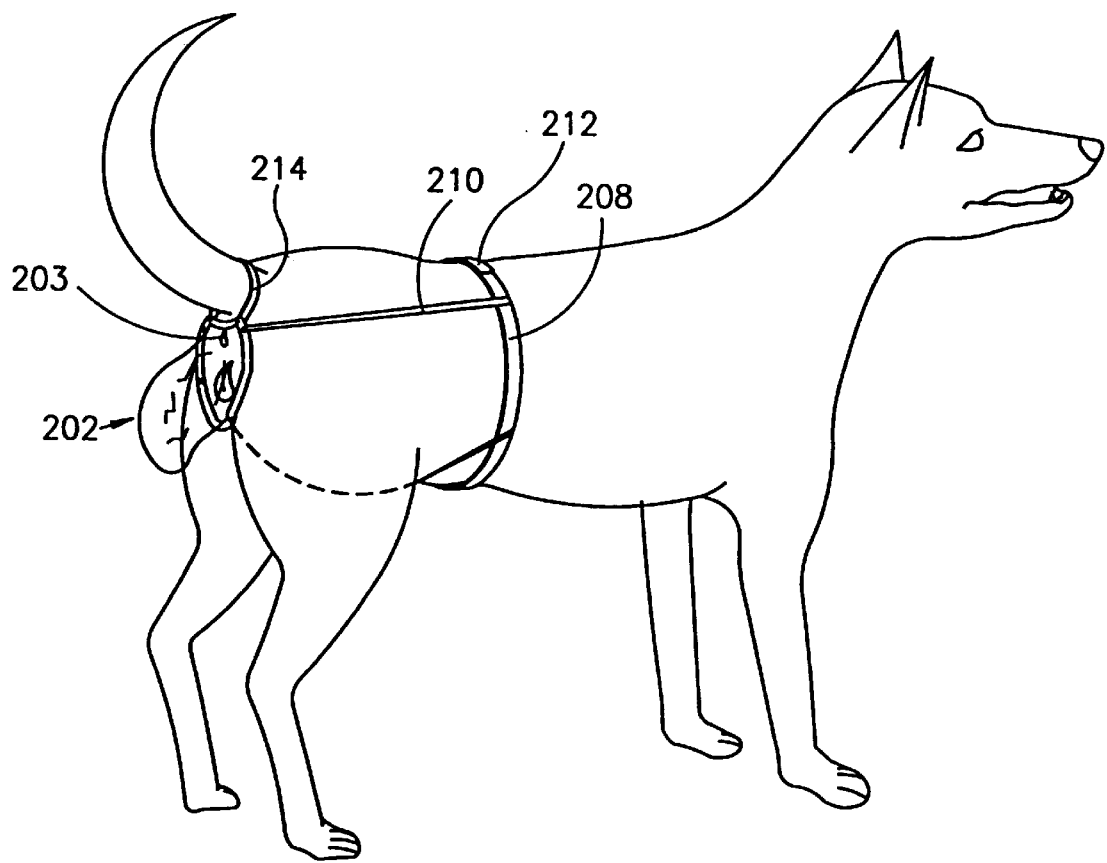
FIG. 9 is a side view of the apparatus of FIG. 8.

Reference is now made to FIGS. 8 and 9. FIG. 8 is a schematic illustration of a further preferred embodiment of the apparatus for waste collection, generally designated 200, in its assembled position. FIG. 9 is a side view of feces collection apparatus 200. Elements which are similar to elements in the embodiments of FIGS. 3–7 described hereinabove, are referenced by similar reference numerals.

Waste collection apparatus 200 comprises a waste collector 202 removably connected to a harness, generally referenced 204. Waste collector 202 comprises a bag support 203 integrally connected to a collection bag 206. Waste collector 202 is connected to harness 204 using any suitable fastening device 207, such as a Velcro® fastener.

Harness 204 comprises a main waist strap 208 connected to one end of a plurality of side straps, collectively referenced 210. Side straps 210, which are preferably elasticated, are suitably connected at their other end to an annular component 211. Annular component 211 is dimensioned so as to match the dimensions of bag support 203 of waste collector 202.

A pair of tail straps 214 which are preferably elasticated, are suitably connected to annular component 211. Each end of tail straps 214 may be fastened to each other by suitable means such as a Velcro® fastener, described hereinabove.

Fastener 212 may be any known in the art fastening device such as a belt buckle. Preferably, fastener 212 is a snap fastener having a fixed receiver 216 and a flexible clip type connector 218. One end of main strap 208 is suitably connected to receiver 216 and the other end 220 of main strap 208 is adjustably connected to connector 218.

It is a feature of the present embodiment of the invention that harness 204 may be worn together or, independently of and separate from waste collector 202. As best illustrated in FIG. 9, the harness 204 is placed around the rear end of the animal so that annular component 211 covers the animal's anus and main strap 208 encircles the animal's body. Since the side straps 210 are preferably elasticated, the harness 204 can be adjusted to suit the size of animal. The main strap 208 can be adjusted by slidingly engaging end 220 within the connector 218 of fastener 212. Tail straps 214 are tied around the animal's tail and fastened together by means of the Velcro® type fastener.

Thus the harness 204 can be adjusted in accordance with the dog's size to ensure close contact of the second frame 211 with the dog's body around its anus or around its anus and its organ. Alternatively, different sizes of harnesses may be used, to suit different types and sizes of dog.

When required, the waste collector 202 together with the collection bag 206 can be attached by means of the Velcro® type fastener to the annular component 211. After use, the waste collector 202 can be detached from the annular component 211 and disposed of. Both the fixing and removable of the waste collector 202 together with its collection bag 206 can be made without directly coming into contact with the animal's anal area and without disturbing the harness 204 itself. Thus, there is no need to remove the harness 204 from the animal in order to remove the collection bag 206 for disposal.

As hereinbefore described with reference to the embodiments of FIGS. 3–7, the waste collector 202 is preferably but not necessarily, both flexible and soft not to disturb the animal's body when attached thereto.

The collection bag 206 for collecting the discharged feces may be made of any suitable material and preferably from water proof material, such as water proof plastic. Alternatively, the support 203 and the bag 206 may be formed of the same material to form one integral unit, such as from Latex.

Preferably, both the waste collector 202 together with its collection bag 206 are made of relatively inexpensive materials, such as rubber, cardboard or plastic and preferably of recyclable materials.

According to an alternative embodiment of the present invention, the main strap 208 may be connected to any suitable animal garment worn by the animal, similar to the dog garment 128, illustrated with respect to the embodiment of FIG. 5.

It will be appreciated that the present invention is described with respect to a dog for exemplary purposes only and that the apparatus may by utilized to collect any animal's waste deposits.

It will be appreciated by persons skilled in the art that the present invention is not limited to what has been particularly shown and described hereinabove. Rather, the scope of the present invention is defined only by the claims that follow:

What is claimed is:

1. Apparatus for collecting animal waste deposit discharges from an animal wearing a garment comprising:

a. a harness to be worn by the animal;

b. a collection bag connected to said harness for collecting the animal waste deposits;

c. securement means for connecting said collection bag to said harness; and d. means for positioning said collection bag in contact with the animal's body when said securement means is connected to said harness, wherein said apparatus is operative as a contraceptive for female animals.

2. Apparatus according to claim 1 wherein said harness includes a waist strap.

3. Apparatus according to claim 1 further including a tail strap for connection around the animal's tail.

4. Apparatus according to claim 3 wherein at least one of said straps is a flexible strap.

5. Apparatus according to claim 3 wherein the length of at least one of said first and second straps can be adjusted.

6. Apparatus according to claim 1 wherein said collection bag comprises:

a. a support to which said securement means is connected and which is in contact with the animal's body; and b. a bag connected to said support for collecting the waste deposits.

7. Apparatus according to claim 6 wherein one side of each of said first and second straps is tied around a respective hole in said support.

8. Apparatus according to claim 6 wherein the upper part of said support forms an arch.

9. Apparatus for collecting animal waste deposits discharges comprising:

a. a first strap;

b. a collection bag for collecting the animal waste deposit;

c. at least one second strap for connecting said collection bag to said fist strap, wherein said collection bag is in contact with the animal's body when said at least one second strap is connected to said first strap; and d. a third strap connected to said collection bag, said third strap being around the tail of the animal.

10. Apparatus according to claim 9 wherein said first strap forms part of an animal's garment.

11. Apparatus according to claim 9 wherein at least one of said first, second or third straps is a flexible strap.

12. Apparatus according to claim 9 wherein said collection bag comprises:

a. a support to which said second strap is connected and which is in contact with the animal's body; and b. a bag connected to said support for collecting the waste deposits.

13. Apparatus according to claim 12 wherein one side of each of said first and second straps is tied around a respective hole in said support.

14. Apparatus according to claim 12 wherein the upper part of said support forms an arch.

15. Apparatus according to claim 9 wherein the length of at least one of said first, second, or third straps can be adjusted.

16. Apparatus for collecting animal waste deposit discharges comprising:

a. a harness worn by the animal;

b. a waste collector removably connected to said harness, said waste collector comprising:

i. a collection bag;

ii. a bag support integrally connected to said collection bag;

c. said harness including support means to place said waste collector in contact with animal's body, wherein said apparatus is operative as a contraceptive for female animals.

17. Apparatus according to claim 16 and wherein said harness comprises:

a. a main waist strap;

b. a plurality of side straps, one end of each of said plurality of side straps connected to said main waist strap; and c. an annular component connected to the other end of each of said plurality of said straps.

18. Apparatus according to claim 17 wherein the length of said main strap can be adjusted.

19. Apparatus according to claim 17 wherein said annular component includes a tail strap means for encircling the animal's tail.

20. Apparatus according to claim 19 wherein the length of said tail strap means can be adjustable connected.

21. Apparatus according to claim 19 wherein the length of said plurality of said straps can be adjusted.

22. Apparatus according to claim 16 wherein said collection bag is adapted to contain feces deposits.

23. Apparatus according to claim 16, including releasable securement means for connecting said collection bag to said bag support.

* * * * *